US012692651B2

(12) United States Patent
Langley et al.

(10) Patent No.: US 12,692,651 B2
(45) Date of Patent: Jul. 28, 2026

(54) COUPLED ESTERS OF POLYLACTIC ACID AND COUPLED ESTERS OF POLYGLYCOLIC ACID AND COMPOSITIONS THEREOF

(71) Applicants: Jeffrey T. Langley, Gastonia, NC (US); Fashion Chemicals GMBH & Co. KG, Geretsried (DE)

(72) Inventors: Jeffrey T. Langley, Gastonia, NC (US); Kay M. McCoy, Fort Mill, SC (US); Paul C. Meredith, Huntersville, NC (US); Philip F. Sims, Waxhaw, NC (US)

(73) Assignees: Jeffrey T. Langley; FASHION CHEMICALS GMBH & CO. KG, Geretsreid (DE)

( * ) Notice: Subject to any disclaimer, the term of this patent is extended or adjusted under 35 U.S.C. 154(b) by 416 days.

(21) Appl. No.: 17/279,650

(22) PCT Filed: Oct. 3, 2019

(86) PCT No.: PCT/US2019/054495
§ 371 (c)(1),
(2) Date: Mar. 25, 2021

(87) PCT Pub. No.: WO2020/072772
PCT Pub. Date: Apr. 9, 2020

(65) Prior Publication Data

US 2021/0372039 A1 Dec. 2, 2021

Related U.S. Application Data

(60) Provisional application No. 62/828,961, filed on Apr. 3, 2019, provisional application No. 62/740,944, filed on Oct. 3, 2018.

(51) Int. Cl.

| | |
|---|---|
| ***D06M 15/53*** | (2006.01) |
| ***C08L 67/04*** | (2006.01) |
| ***C08L 71/02*** | (2006.01) |
| ***D06M 15/256*** | (2006.01) |
| *D06M 101/06* | (2006.01) |
| *D06M 101/32* | (2006.01) |
| *D06M 101/34* | (2006.01) |

(52) U.S. Cl.
CPC ............. *D06M 15/53* (2013.01); *C08L 67/04* (2013.01); *C08L 71/02* (2013.01); *D06M 15/256* (2013.01); *C08L 2201/06* (2013.01); *D06M 2101/06* (2013.01); *D06M 2101/32* (2013.01); *D06M 2101/34* (2013.01); *D06M 2200/01* (2013.01); *D06M 2200/40* (2013.01)

(58) Field of Classification Search
CPC ............. D06M 15/507; D06M 15/563; D06M 2200/01; D06M 15/53; D06M 2101/32; A61K 2300/00; A61K 47/34; C08G 63/66; C08G 63/08; A61F 2002/30062; A61F 2002/30064; D04H 3/011; C11D 3/3715; C11D 3/3707; C11D 3/0036; Y10T 442/227
See application file for complete search history.

(56) References Cited

U.S. PATENT DOCUMENTS

| | | | | |
|---|---|---|---|---|
| 2,917,410 | A | 12/1959 | Vitalis | |
| 5,565,215 | A | 10/1996 | Gref et al. | |
| 6,007,845 | A | 12/1999 | Domb et al. | |
| 6,322,805 | B1 * | 11/2001 | Kim | A61P 35/00 424/426 |
| 6,579,837 | B1 | 6/2003 | Fleury et al. | |
| 2003/0068377 | A1 | 4/2003 | Fowers et al. | |
| 2006/0034888 | A1 | 2/2006 | Pacetti et al. | |
| 2009/0110711 | A1 * | 4/2009 | Trollsas | A61K 31/56 514/183 |
| 2018/0235752 | A1 * | 8/2018 | Wen | A61F 2/186 |

FOREIGN PATENT DOCUMENTS

| | | | |
|---|---|---|---|
| EP | 1 297 938 | B1 | 4/2003 |
| JP | H09-504042 | A | 4/1997 |
| JP | H09504308 | A | 4/1997 |
| JP | H10-287735 | A | 10/1998 |
| JP | H11-035655 | A | 2/1999 |
| WO | 9503356 | A1 | 2/1995 |
| WO | 03/028589 | A1 | 4/2003 |
| WO | 2019/070950 | A1 | 4/2019 |

OTHER PUBLICATIONS

International Search Report for PCT/US2019/054495 dated Jan. 28, 2020, 3 pages.
Espacenet bibliographic data for EP 1297398 dated Oct. 13, 2004, 1 page.

* cited by examiner

*Primary Examiner* — Marla D Mcconnell
*Assistant Examiner* — Christine X Nisula
(74) *Attorney, Agent, or Firm* — Oliff PLC

(57) ABSTRACT

Esters of polylactic acid, including polyethylene glycol esters of polylactic acid, that are coupled with an acid are disclosed. Exemplary coupled esters of polylactic acid can be used as textile finishes. Methods of making the coupled esters of polylactic acid via direct and/or transesterification reactions are also disclosed.

8 Claims, 1 Drawing Sheet

Example of Typical Standard Curve and Calibration Equation Determination
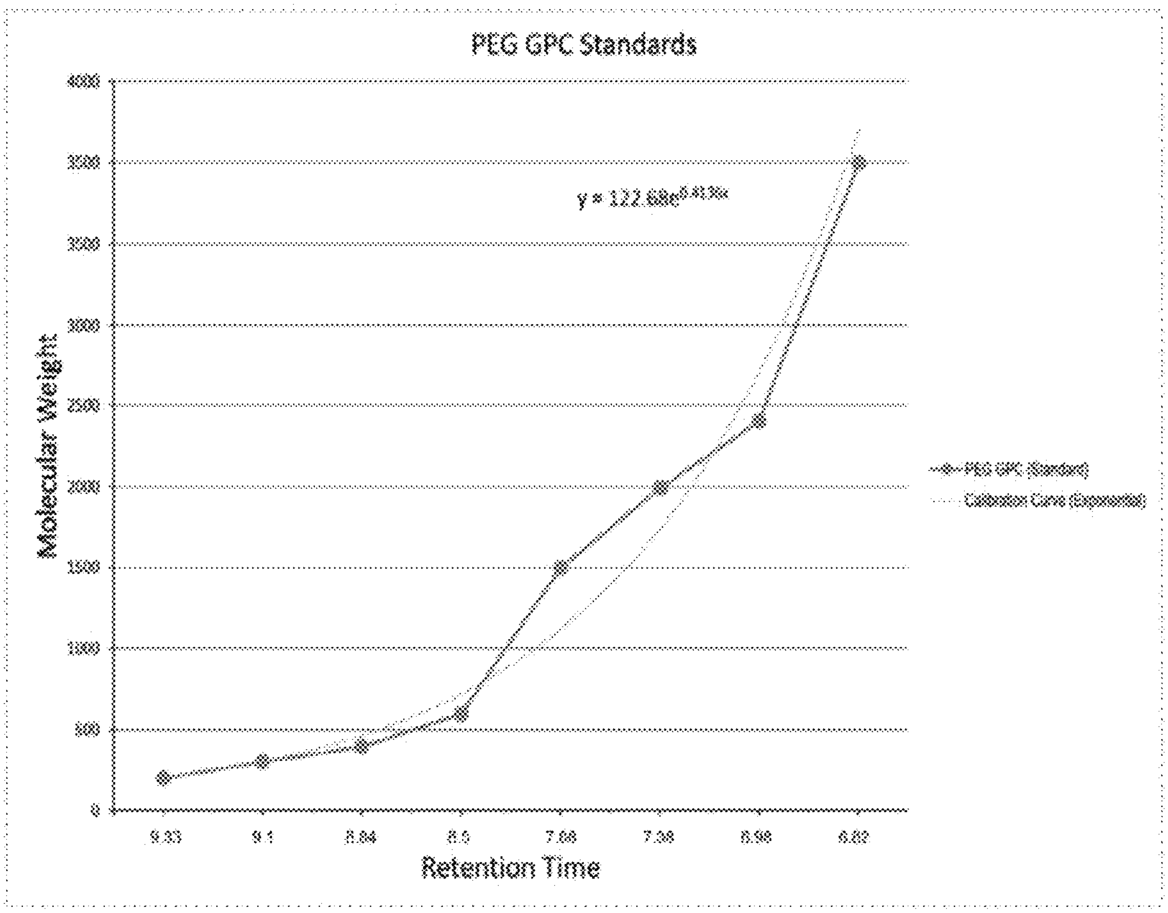

COUPLED ESTERS OF POLYLACTIC ACID AND COUPLED ESTERS OF POLYGLYCOLIC ACID AND COMPOSITIONS THEREOF

CROSS-REFERENCE TO PRIORITY APPLICATIONS

This international application hereby claims the benefit of U.S. Patent Application No. 62/740,944 for Novel Coupled Esters of Polylactic Acid and Coupled Esters Polyglycolic Acid and Compositions Thereof (filed Oct. 3, 2018) and U.S. Patent Application No. 62/828,961 for Novel Coupled Esters of Polylactic Acid and Coupled Esters Polyglycolic Acid and Compositions Thereof (filed Apr. 3, 2019), each of which is hereby incorporated by reference in its entirety.

FIELD OF THE INVENTION

The present invention relates to novel coupled esters of polylactic acid and coupled esters of polyglycolic acid that include a coupler and methods of making the novel coupled esters. The present invention also relates to compositions including the novel coupled esters.

BACKGROUND

High molecular weight polymers such as polyesters and polyolefins are commonly used to make fibers and fibrous articles such as yarns, fabrics, and nonwoven fabric. Surfaces of items fabricated from polyesters and polyolefins are, by their chemical nature, hydrophobic. In many applications, it is desirable that the surface of an article have hydrophilic properties. Topical coatings or finishes are often used on polyester and polyolefin articles to counter their hydrophobic nature and impart hydrophilicity. Polyesters, such as polylactic acid ("PLA") and polyolefins are used in many products, including absorbent products such as diapers. Because polylactic acid can be derived from renewable sources like corn instead of petroleum, polylactic acid is compostable and biodegradable. Polylactic acid has properties similar to polypropylene ("PP"). Polylactic acid can be substituted for polypropylene and other non-biodegradable plastics made from non-renewable petroleum. Because of concerns of toxicity of lower molecular weight compounds that are used in consumer products, lower molecular weight esters of polylactic acid (which are polymers) that may have advantageous properties may not be approved or allowed for use. Thus, it would be helpful to overcome toxicity concerns so that the lower molecular weight esters can be used.

SUMMARY

Applicant has discovered that esters of polylactic acid ("PLA") can be coupled together to form higher molecular weight esters of PLA ("coupled esters of PLA" or "coupled esters"), yet provide advantageous properties for fibers and textiles made from fiber that are comparable to lower molecular weight esters of PLA that are not coupled ("uncoupled esters of PLA"). Coupled esters of PLA, such as PEG coupled esters of PLA, can be compostable and/or biodegradable and can be, therefore, useful along with PLA polymers to make products that are compostable and/or biodegradable. Esters of polyglycolic acid ("PGA") can also be coupled together to form higher molecular weight esters ("coupled esters of PGA") yet provide advantageous properties for fibers and textiles made from fiber that are comparable to lower molecular weight esters of PGA that are not coupled ("uncoupled esters of PGA").

In one aspect, the present invention relates to coupled esters of polylactic acid. In one embodiment, the coupled esters of polylactic acid can include a diol, for example polyethylene glycol ("PEG") or 1,3 propanediol. In another embodiment the coupled esters of PLA can include a polyol, for example polyglycerol, sugars, and sugar alcohols. In another embodiment the coupled esters can include a combination of one or more diols. In another embodiment, the coupled esters can include a combination of one or more polyols. In yet another embodiment, the couple esters can include a combination of one or more diols and one or more polyols.

In another aspect, the present invention relates to coupled esters of PGA. In one embodiment, the coupled esters of PGA can include a diol, for example polyethylene glycol ("PEG") or 1,3 propanediol. In another embodiment the coupled esters of PGA can include a polyol, for example polyglycerol, sugars, and sugar alcohols. In another embodiment the coupled esters can include a combination of one or more diols. In another embodiment, the coupled PGA esters can include a combination of one or more polyols. In yet another embodiment, the coupled PGA esters can include a combination of one or more diols and one or more polyols.

In another aspect, the present invention relates to methods of manufacturing the coupled esters of PLA (i.e., to yield a chemical compound including reaction products). Such esters of PLA can be made by reacting (i) a diol and/or a polyol, (ii) polylactic acid, lactide, or lactic acid, and (iii) a carboxylic acid (or "coupler"). Mixtures or combinations of diols and/or polyols can also be reacted with polylactic acid, lactide, or lactic acid to form coupled esters of PLA. Optionally, an alcohol (e.g., an aliphatic C1-C14 alcohol) can be added to the reactants.

In another aspect, the present invention relates to methods of manufacturing the esters of PGA (i.e., to yield a chemical compound including reaction products). Such esters of polyglycolic acid can be made by reacting (i) a diol and/or a polyol, (ii) PGA or glycolic acid and (3) a coupler. Mixtures or combinations of diols and/or polyols can also be reacted with PGA or glycolic acid to form coupled esters of PGA. Optionally, an alcohol (e.g., an aliphatic C1-C14 alcohol) can be added to the reactants.

In another aspect, the present invention relates to textiles that are treated with compositions containing coupled esters of PLA and/or PGA. Coupled esters of polylactic acid and polyglycolic acid can be compostable and/or biodegradable and are, therefore, useful along with polylactic acid polymers to make products that are compostable and/or biodegradable.

BRIEF DESCRIPTION OF THE DRAWING

The FIGURE illustrates a standard curve and calibration equation determination used in Gel Permeation Chromatography (GPC) for PEG standards. The graph plots molecular weight on the y-axis ranging from 0 to 4000 against retention time on the x-axis. The marked data points representing individual PEG standards form a calibration curve that increases as retention time decreases. The relationship is mathematically defined by an exponential equation.

DETAILED DESCRIPTION

In one aspect, the present invention relates to esters of PLA that are coupled together with an acid (e.g., an acid coupler). Suitable acids that can couple esters of PLA together include dicarboxylic acids (e.g., succinic acid, malonic acid, glutaric acid, and/or adipic acid), aromatic dicarboxylic acid (e.g., terephthalic acid, isophthalic acid, phthalic acid, diphenic acid, and/or 2,6-naphthalenedicarboxylic acid), tricarboxylic acids (e.g., citric acid, aconitic acid, and/or trimesic acid). The coupled esters of PLA can include at least PLA-PEG-coupler-PEG-PLA esters, PLA-PEG-coupler-PEG-PLA esters, PEG-PLA-coupler-PLA-PEG, PEG-PLA-coupler-PEG-PLA-coupler-PEG-PLA.

In another aspect, the present invention relates to esters of PGA that are coupled together with an acid (e.g., an acidic coupler). Suitable acids that can couple esters of PGA together include dicarboxylic acids (e.g., succinic acid, malonic acid, glutaric acid, and/or adipic acid), aromatic dicarboxylic acid (e.g., terephthalic acid, isophthalic acid, phthalic acid, diphenic acid, and/or 2,6-naphthalenedicarboxylic acid), tricarboxylic acids (e.g., citric acid, aconitic acid, and/or trimesic acid). The coupled esters of PGA can include at least PGA-PEG-coupler-PEG-PGA esters, PGA-PEG-coupler-PEG-PGA esters, PEG-PGA-coupler-PGA-PEG, PEG-PGA-coupler-PEG-PGA-coupler-PEG-PGA.

In another aspect, the present invention relates to compositions that include coupled esters of PLA. These compositions can be used as finishes on textiles made from polyester, such as PLA and polyolefins. The coupled esters of PLA can also be useful as finishes on other synthetic polymers (e.g., polyamides, acrylics, nylons, polypropylene, and aramids), and man-made fibers (e.g., acetate, lyocell, and rayon). The coupled esters of PLA can also be useful on natural fibers (e.g., bamboo, cotton, flax, hemp, and wool). Coupled esters of PLA and compositions comprising coupled esters of PLA are capable of coating the surface of a hydrophobic material, such as a textile made of PLA and/or polypropylene and are capable of changing the surface of the material from hydrophobic to hydrophilic or, if the material is already hydrophilic, increasing the hydrophilicity of the material. Thus, another aspect of the present invention is a material to which one or more coupled esters of PLA are applied.

In another aspect, the present invention relates to compositions that include coupled esters of PGA. These compositions can be used as finishes on textiles made from polyester, such as PGA and polyolefins. The coupled esters of PLA can also be useful as finishes on other synthetic polymers (e.g., polyamides, acrylics, nylons, polypropylene, and aramids), and man-made fibers (e.g., acetate, lyocell, and rayon). The coupled esters of PGA can also be useful on natural fibers (e.g., bamboo, cotton, flax, hemp, and wool). Coupled esters of PGA and compositions comprising coupled esters of PGA are capable of coating the surface of a hydrophobic material, such as a textile made of PGA and/or polypropylene and are capable of changing the surface of the material from hydrophobic to hydrophilic or, if the material is already hydrophilic, increasing the hydrophilicity of the material. Thus, another aspect of the present invention is a material to which one or more coupled esters of PGA are applied.

In another aspect, the present invention relates to compositions that include coupled esters of PLA. These compositions can be useful as finishes on textiles made from polyester, such as PLA and polyolefins. The coupled esters of PLA can also be useful as finishes on other synthetic polymers (e.g., polyamides, acrylics, nylons, polypropylene, and aramids), and man-made fibers (e.g., acetate, lyocell, and rayon). The coupled esters of PLA can also be useful on natural fibers (e.g., bamboo, cotton, flax, hemp, and wool). Coupled esters of PLA and compositions comprising coupled esters of PLA are capable of coating the surface of a hydrophobic material, such as a textile made of PLA and/or polypropylene and are capable of changing the surface of the material from hydrophobic to hydrophilic or, if the material is already hydrophilic, increasing the hydrophilicity of the material. Thus, another aspect of the present invention is a material to which one or more coupled esters of PLA are applied.

In another aspect, the present invention relates to compositions that include coupled esters of PLA and/or PGA. These compositions can be useful as finishes on textiles made from polyester, such as PLA and polyolefins. The coupled esters of PLA can also be useful as finishes on other synthetic polymers (e.g., polyamides, acrylics, nylons, polypropylene, and aramids), and man-made fibers (e.g., acetate, lyocell, and rayon). The coupled esters of PLA can also be useful on natural fibers (e.g., bamboo, cotton, flax, hemp, and wool). Coupled esters of PLA and compositions comprising coupled esters of PLA are capable of coating the surface of a hydrophobic material, such as a textile made of PLA and/or polypropylene and are capable of changing the surface of the material from hydrophobic to hydrophilic or, if the material is already hydrophilic, increasing the hydrophilicity of the material. Thus, another aspect of the present invention is a material to which one or more coupled esters of PLA are applied.

In one embodiment, the material can be a nonwoven textile, such as a spunbond, melt-blown, carded, air laid, wet laid, or combinations thereof. Examples of nonwoven textiles include polyester top sheets for diapers. In another embodiment, the textile can be a woven or knitted textile (e.g., garments, including sports clothing). Textiles include fibers, filaments, yarns, woven, nonwoven, and knitted fabrics.

In one embodiment, esters of PLA include esters of one or more polyols and PLA. As used herein, the term "polyol" can include without limitation a compound with more than one hydroxyl group, for example, two hydroxyl groups (also referred to herein as a diol) and/or three or more hydroxyl (—OH) groups.

Diols can include without limitation C2-C20, for example C2-C3, C2-C4, C2-05, C2-C6, C2-C7, C2-C8, C2-C9 etc., linear, branched and/or cyclic diols, and/or polymers thereof (such as polyethers). Examples of diols can include without limitation ethylene glycol, 1,2-propanediol, 1,3-propanediol, 1,4-butanediol, 1,5-pentanediol, 1,6-hexanediol, PEG, polypropylene glycol (PPG), and the like, and/or combinations and/or mixtures thereof. In one embodiment, the PEG can include a single capped PEG.

Polyols with three or more hydroxyl groups can include without limitation C3-C20, for example, C3-C4, C3-05, C3-C6, C3-C7, C3-C8, C3-C9 etc., linear, branched and/or cyclic polyols, and/or polymers thereof (such as polyethers). Examples of polyols with three or more hydroxyl groups can include without limitation glycerol and/or polymers thereof (such as tri-, penta-, and/or deca-glycerol), sugar alcohols, sugars, and the like, and/or combinations and/or mixtures thereof. Examples of sugar alcohols can include without limitation erythritol, threitol, arabitol, ribitol, xylitol, mannitol, sorbitol, galactitol, iditol, volemitol, fucitol, maltitol, lactitol, isomalt, and the like and/or mixtures and/or combinations thereof. Examples of sugars can include without limitation monosaccharides and/or disaccharides, such as glucose, fructose, galatose, sucrose, lactose, maltose, and the like and/or combinations and/or mixtures thereof.

Therefore, in one embodiment, coupled esters of PLA include coupled PEG esters of PLA. In another embodiment, coupled esters of PLA include coupled 1,3 propanediol esters of PLA. In yet another embodiment, coupled esters of PLA include coupled polyol (e.g., polyglycerol, sugars, and/or sugar alcohols) esters of PLA. In a further embodiment, coupled esters of PLA can include two or more of the following coupled esters of PLA: coupled PEG esters of PLA, coupled 1,3 propanediol esters of PLA, coupled polyol esters of PLA, and/or combinations thereof. The coupled esters of PLA can include coupled esters made by reacting (i) a diol (e.g., PEG or 1,3 propanediol), and/or a polyol (e.g., a glycerol, such as tri-, penta-, or deca-glycerol), or a sugar, or a sugar alcohol with (ii) PLA, lactide, or lactic acid. The lactide can be D-, L-, or DL-lactide. Thus, the coupled esters of PLA can include PEG coupled esters of PLA, glycerol coupled esters of PLA, 1,3 propanediol coupled esters of PLA, sugar coupled esters of PLA, and sugar alcohol coupled esters of PLA. In another embodiment, coupled esters of PLA include PEG coupled esters of PLA. In another embodiment, compositions include glycerol coupled esters of PLA. In another embodiment, compositions include 1,3 propanediol coupled esters of PLA. In another embodiment, compositions include sugar coupled esters of PLA. In another embodiment, compositions include sugar alcohol coupled esters of PLA. In another embodiment, the coupled esters of PLA can include a combination of two or more of PEG coupled esters of PLA, glycerol coupled esters of PLA, 1,3 propanediol coupled esters of PLA, sugar coupled esters of PLA, and sugar alcohol coupled esters of PLA. The compositions can include water and/or another solvent with one or more of the coupled esters of PLA to provide a finish for textiles.

In another aspect, the present invention relates to a method of making coupled esters of PLA. In one embodiment, coupled esters of PLA can be made by reacting (i) a diol as described above that can include without limitation PEG or 1,3 propanediol) and/or polyol (as described above that can include without limitation a polyglycol, a polyglycerol, including tri-, penta-, or deca-glycerol), or a sugar, or a sugar alcohol, (ii) a coupler, and (iii) a PLA, lactic acid, and/or a lactide. The reaction can take place by heating the reactants with a catalyst. The catalyst can be a basic catalyst (e.g., sodium carbonate, and/or calcium carbonate). The catalyst may also be a Lewis acid catalyst, such as stannous octoate. The reaction can take place without a catalyst. The reaction is conducted at temperatures sufficient to melt the PLA and to initiate the reaction to form the coupled esters of PLA. Although the temperature to initiate the reaction between PEG and PLA can be 140° C. to 200° C., the temperature required to melt PLA is at least about 160° C. Thus, the reaction of PEG and PLA can take place between 160° C. and 200° C. or between 170° C. and 190° C. A solvent can be used to dissolve the diol and/or polyol or a combination of diol and polyol to facilitate the reaction with PLA. Optionally, an alcohol (e.g., an aliphatic C1 to C14 alcohol, such as methanol, ethanol, propanol, butanol, 2-ethylhexanol, C8C10 alcohol) can be added to the reactants. Typically, the alcohol can be added to the reactants prior to initiation of the reaction. Alternatively, the alcohol can be added after initiation of the reaction. Adding the alcohol may advantageously result in the PLA ester having a higher pH to offset partially the effect of the acid on the pH of the PLA ester. The aliphatic alcohol can be added in an amount between 1 and 2 times the amount of diacid coupler.

The initial PLA to diol and/or polyol weight percentages for the reactants can be between 25 and 75 percent PLA and 75 and 25 percent diol and/or polyol, between 30 and 70 percent PLA and 70 to 30 percent diol and/or polyol, between 35 and 65 percent PLA and 65 and 35 percent diol and/or polyol, between 40 and 60 percent PLA and 60 and 40 percent diol and/or polyol, and between 45 and 55 percent PLA and 55 and 45 percent diol and/or polyol. In one embodiment, the initial weight percent of PLA is greater than 50 percent of the reactants, and therefore, the initial weight percent of the diol and/or polyol is less than 50 percent of the reactants. The initial weight percent PEG to PLA ratio (PEG:PLA) can be between 75:25 and 25:75, between 70:30 and 30:70, between 65:35 and 35:65, between 60:40 and 40:60. The initial mole ratio of acid coupler to polyethylene glycol can be between 0.2 and 1.0, such as between 0.4 and 1.0 (e.g., between 0.4 and 0.8). The reaction temperature is typically between 160° C., and 200° C. or 170° C. to 190° C.

The reaction time required to provide sufficient yields of the coupled esters of PLA can vary based on the molecular weight of the PLA, the diol and/or polyol, the temperature and pressure of the reaction, the use of a catalyst, and, in the case of direct esterification, the rate of removal of water during the reaction. The reaction time should be sufficient to achieve a suitable conversion of the PLA to esters of PLA to provide a clear, stable emulsion with water. The color of the emulsion based on the Gardner Color Scale can be less than 4, such as 3 or less (e.g., less than 2). The reaction time can be between 1 hour and 10 hours, between 2 hours and 6 hours, and between 3 and 5 hours after the temperature reaches the melting point temperature of PLA. Typically, the reaction is continued until a clear to hazy mass is formed indicating that the formation of the ester of polylactic acid is substantially completed (i.e., greater than 75, 80, 85, 90, or 95 percent conversion of PLA to the ester of PLA).

When PEG and PLA are reacted with the coupler, esters formed by the reaction (e.g., exemplary reaction products) include esters having the follow formulas:

(i)

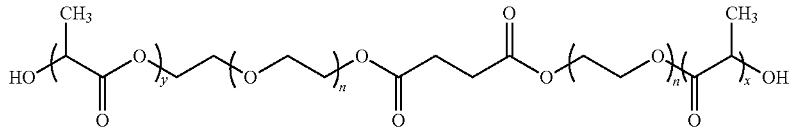

PLA PEG Coupler PEG PLA

-continued (ii)

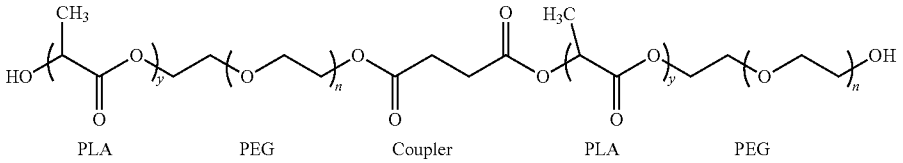

(iii)

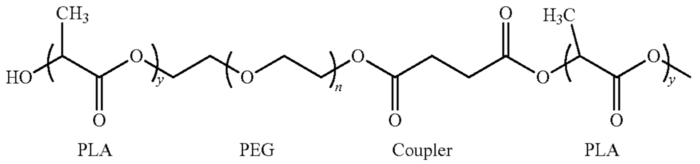

(iv)

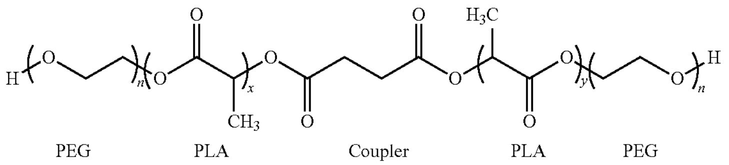

(v)

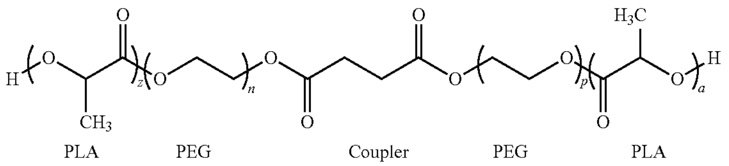

(vi)

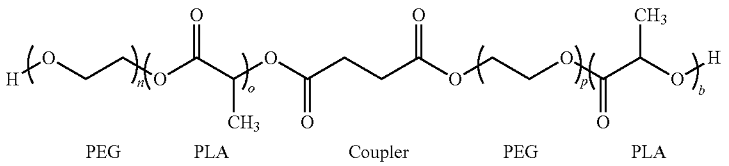

(vii)

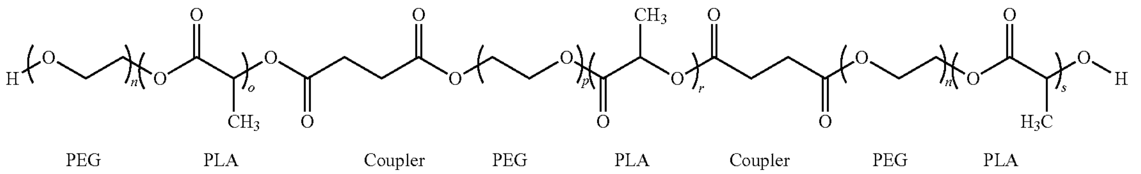

With respect to the exemplary esters having the foregoing formulas, n can be an integer greater than 1 and less than 90, 80, 70, 60, 50, 40, 30, 20, 10, or 5 and a, b, o, r, s, x, y, and z can be an integer greater than 1 and less than 10 or greater than 1 and less than 5. Integers a, b, n, o, r, s, x, y, and z can be equal or unequal.

PLA is made from renewable materials, such as corn, sugarcane, sugar beet, and cassava. The PLA that can be used is not limited by molecular weight and can have a weight-average molecular weight ($M_w$) between (e.g., 10,000 and 150,000 daltons (g/mol)). PEG is typically made from petroleum but can also be made from all natural, renewable material, such as corn, sugarcane, sugar beet and cassava. Thus, the coupled esters of PLA can be made from all-natural, renewable material and is compostable and/or biodegradable. The weight-average molecular weight of the PEG units in the coupled esters of PLA can be between 100 and 5000 daltons, between 100 and 4000 daltons, between 100 and 2000 daltons, between 100 and 1000 daltons, between 100 and 800 daltons, and between 100 and 600 daltons. In one embodiment, the weight-average molecular weight is about 400 daltons. The weight-average molecular weight of the coupled PEG esters of PLA can be less than 5000 daltons, less than 4000 daltons, less than 3000 daltons, less than 2000 daltons, less than 1000 daltons, less than 975 daltons, less than 950 daltons, less than 900 daltons, less than 800 daltons, less than 700 daltons, less than 600 daltons, less than 500 daltons, or less than 400 daltons. The weight-average molecular weight of coupled esters of PLA made by reacting diol or polyol with PLA can be less than 5000 daltons, less than 4000 daltons, less than 3500 daltons, less than 3000 daltons, less than 2500 daltons, less than 2000 daltons, less than 1500 daltons, less than 1000 daltons, less than 975 daltons, less than 950 daltons, less than 900 daltons, less than 800 daltons, less than 700 daltons, less than 600 daltons, less than 500 daltons, or less than 400 daltons.

In one embodiment, coupled esters of PGA include coupled PEG esters of PGA. In another embodiment, coupled esters of PGA include coupled 1,3 propanediol esters of PGA. In yet another embodiment, coupled esters of PGA include coupled polyol (e.g., polyglycerol, sugars, and/or sugar alcohols) esters of PGA. In a further embodiment, coupled esters of PGA can include two or more of the following coupled esters of PGA: coupled PEG esters of PGA, coupled 1,3 propanediol esters of PGA, coupled polyol esters of PGA, and/or combinations thereof. The coupled esters of PGA can include coupled esters made by reacting (i) a diol (e.g., PEG or 1,3 propanediol), and/or a polyol (e.g., a glycerol, such as tri-, penta-, or deca-glycerol), or a sugar, or a sugar alcohol with (ii) polyglycolic acid or glycolic acid. Optionally, an alcohol (e.g., an aliphatic C1 to C14 alcohol, such as methanol, ethanol, propanol, butanol, 2-ethylhexanol, C8C10 alcohol) can be added to the reactants. Typically, the alcohol can be added to the reactants prior to initiation of the reaction. Alternatively, the alcohol can be added after initiation of the reaction. Adding the alcohol may advantageously result in the PGA ester having a higher pH to offset partially the effect of the acid on the pH of the PGA ester. The aliphatic alcohol can be added in an amount between 1 and 2 times the amount of diacid coupler.

Thus, the coupled esters of PGA can include PEG coupled esters of PGA, glycerol coupled esters of PGA, 1,3 propanediol coupled esters of PGA, sugar coupled esters of PGA, and sugar alcohol coupled esters of PGA. In another embodiment, coupled esters of PGA include PEG coupled esters of PGA. In another embodiment, compositions include glycerol coupled esters of PGA. In another embodiment, compositions include 1,3 propanediol coupled esters of PGA. In another embodiment, compositions include sugar coupled esters of PGA. In another embodiment, compositions include sugar alcohol coupled esters of PGA. In another embodiment, the coupled esters of PGA can include a combination of two or more of PEG coupled esters of PGA, glycerol coupled esters of PGA, 1,3 propanediol coupled esters of PGA, sugar coupled esters of PGA, and sugar alcohol coupled esters of PGA. The compositions can include water and/or another solvent with one or more of the coupled esters of PGA to provide a finish for textiles.

The initial PGA to diol and/or polyol weight percentages for the reactants can be between 25 and 75 percent PGA and 75 and 25 percent diol and/or polyol, between 30 and 70 percent PGA and 70 to 30 percent diol and/or polyol, between 35 and 65 percent PGA and 65 and 35 percent diol and/or polyol, between 40 and 60 percent PGA and 60 and 40 percent diol and/or polyol, and between 45 and 55 percent PGA and 55 and 45 percent diol and/or polyol. In one embodiment, the initial weight percent of PGA is greater than 50 percent of the reactants, and therefore, the initial weight percent of the diol and/or polyol is less than 50 percent of the reactants. The initial weight percent PEG to PGA ratio (PEG:PGA) can be between 75:25 and 25:75, between 70:30 and 30:70, between 65:35 and 35:65, between 60:40 and 40:60. The reaction temperature is typically between 160° C., and 200° C. or 170° C. to 190° C.

As reported herein, the weight-average molecular weights of coupled esters of esters of PLA and coupled esters of PGA can be determined by gel permeation chromatography ("GPC") using a standard High Performance Liquid Chromatography ("HPLC") system employing a GPC column and evaporative light scattering detection ("ELSD"). Retention times of standards are fitted to a calibration equation, and this equation is used to determine weight-average molecular weight of an unknown polymer. The column used is a Jordi Gel DVB 500A (300×07.8 mm, Catalog number 15071). The method is isocratic employing Tetrahydrofuran ("THF") at 1 ml/min. Standard run time is 30 minutes, but most all components are eluded within 15 minutes. Detection is accomplished with an evaporative light scattering detector ("ELSD"). The ELSD unit employed is an Alltech 500 ELSD with ELSD LTA accessory. The LTA unit is set to operate at 41° C. The ELSD unit drift tube is set at 70° C., and nitrogen gas flow is set at 1.84 SLPM. In accordance with the foregoing, The FIGURE provides an exemplary calibration equation used to determine weight-average molecular weight of a polymer.

In another aspect, the present invention relates to a method of making coupled esters of PGA. In one embodiment, coupled esters of the present invention can be made by reacting (i) a diol (e.g., PEG or 1,3 propanediol) and/or polyol (e.g., a polyglycol, a polyglycerol, including tri-, penta-, or deca-glycerol), or a sugar, or a sugar alcohol, (ii) a coupler, and (iii) a PGA, glycolic acid, and/or poly (lactic acid-co-glycolic acid) acid. The reaction can take place by heating the reactants with a catalyst. The catalyst can be a basic catalyst (e.g., sodium carbonate, and/or calcium carbonate). The catalyst may also be a Lewis acid catalyst, such as stannous octoate. The reaction can take place without a catalyst. The reaction is conducted at temperatures sufficient to melt the PGA and to initiate the reaction to form the coupled esters of PGA. Although the temperature to initiate the reaction between PEG and PLA can be 140° C. to 200° C., the temperature required to melt PGA is at least about 160° C. Thus, the reaction of PEG and PGA can take place between 160° C. and 200° C. or between 170° C. and 190° C. A solvent can be used to dissolve the diol and/or polyol or a combination of diol and polyol to facilitate the reaction with PGA.

In another embodiment, coupled esters of the present invention can be made by direct esterification by reacting (i) a diol (e.g., PEG or 1,3 propanediol), and/or a polyol (e.g., a glycerol, such as tri-, penta-, or deca-glycerol), or a sugar, or a sugar alcohol, (ii) a lactide, lactide intermediate, or lactic acid, and a coupler. The lactide can be D-lactide, L-lactide, and/or DL-lactide. A solvent can be used to dissolve the diol or polyol or combination of diols and/or polyol to facilitate the reaction with the lactide, lactide intermediate, or lactic acid. The reaction can take place in the presence of a mineral acid (e.g., sulfuric acid or dry hydrogen chloride), which acts as a catalyst to speed up the reaction and to remove water. Removing water can also be accomplished, for example, by contacting, for example, sparging, the reaction mixture with an inert gas or a dry gas that does not interfere with the reaction, such as nitrogen, and/or by distilling the reaction products.

Table 1 (below) identifies exemplary PEG esters of polylactic acid and coupled PEG esters of polylactic acid that have been made along with the components (i.e., reactants) used to make the esters and coupled esters (i.e., exemplary reaction products), along with charge ratios of the components, the characteristics of the esters and coupled esters and GPC results of the esters and coupled esters:

TABLE 1

| General Description | Name of Component: PLA | PEG | Coupling Agent | Charge Ratios: PLA wt % | PEG wt % | Coupling Agent Mole Ratio (to PEG) | Characteristics: Viscosity (cps) |
|---|---|---|---|---|---|---|---|
| PLA PEG 400 | PLA | 400 | NA | 50% | 50% | NA | 2212 |
| PLA PEG 600 | PLA | 600 | NA | 50% | 50% | NA | |
| PLA PEG 400 + Citric Acid (0.44 eq) | PLA | 400 | Citric Acid | 41% | 41% | 0.44 eq | NA |
| PLA PEG 400 + Less Citric Acid (0.2 eq) | PLA | 400 | Citric Acid | 46% | 46% | 0.2 eq | 4259 |
| PLA PEG 400 + Dimethyl Glutamate (0.8 eq) | PLA | 400 | Dimethyl Glutarate | 43% | 43% | 0.8 eq | 909.8 |
| PLA PEG 400 + Adipic Acid (1.16 eq) | PLA | 400 | Adipic Acid | 42% | 42% | 1.16 eq | 21245 |
| PLA PEG 400 + Succinic Acid (0.8 eq) | PLA | 400 | Succinic Acid | 45% | 45% | 0.80 eq | 37242 |
| PLA PEG 550 Methyl Capped | PLA | 550 monomethyl | NA | 50% | 50% | NA | 12497 |
| PLA PEG 400 Sodium Borohydride | PLA | 400 | NA | 50% | 50% | NA | 1920 |
| PLA PEG 1000 Methyl Capped | PLA | 1000 monomethyl | NA | 50% | 50% | NA | NA |
| PLA PEG 600 | PLA | 600 | NA | 50% | 50% | NA | 1030 |
| PLA PEG 400 | PLA | 400 | NA | 50% | 50% | NA | 2050 |
| PLA PEG 600 + Citric Acid (0.595 eq) | PLA | 600 | Citric Acid | 38% | 38% | 0.595 eq | NA |
| PLA PEG 300 + Citric Acid (0.635 eq) | PLA | 300 | Citric Acid | 38% | 38% | 0.635 eq | NA |
| Lactic Acid PEG400 | Lactic Acid | 400 | NA | 50% | 50% | NA | 508 |
| PLA PEG 400 + Citric Acid (0.5 eq) Higher PEG | PLA | 400 | Citric Acid | 40% | 60% | 0.5 eq | 3419 |
| PLA PEG 600 + Succinic Acid (0.5 eq) Higher PEG | PLA | 600 | Succinic Acid | 40% | 60% | 0.50 eq | 8878 |
| PLA Hydrolyzed + PEG400 + Citric Acid | PLA | 400 | Citric Acid | 50% | 50% | | |
| PLA PEG600 + Succinic Acid | PLA | 600 | Succinic Acid | 40% | 60% | 0.50 eq | |
| PLA PEG600 + Succinic Acid + 2EtHexOH | PLA | 600 | Succinic Acid | 40% | 60% | 0.50 eq | |
| PLA PEG600 + Succinic Acid + C8C10 Alcohol | PLA | 600 | Succinic Acid | 40% | 60% | 0.25 eq | |
| PLA PEG600 + Succinic Acid + C8C10 Alcohol | PLA | 600 | Succinic Acid | 40% | 60% | 0.50 eq | |
| PLA PEG600 + Succinic Acid + C8C10 Alcohol | PLA | 600 | Succinic Acid | 40% | 60% | 0.50 eq | |
| PLA PEG600 + Diethyl Succinate | PLA | 600 | Diethyl Succinate | 40% | 60% | 0.50 eq | 8 |
| Lactide PEG600 | Lactide | 600 | None | 40% | 60% | NA | 0 |
| Lactide PEG600 + Succinic Acid | Lactide | 600 | Succinic Acid | 40% | 60% | 0.50 eq | |
| Lactide PEG400 | Lactide | 400 | None | 40% | 60% | N/A | 0 |
| Lactide PEG600 | Lactide | 600 | None | 60% | 40% | N/A | 0 |
| Lactide PEG600 | Lactide | 600 | None | 70% | 30% | N/A | 0 |
| PLA PEG400 | PLA | 400 | None | 40% | 60% | N/A | 0 |
| Lactide PEG400 | Lactide | 400 | None | 40% | 60% | N/A | 1 |
| Lactide PEG 600/ Succinic Acid | Lactide | 600 | Succinic Acid | 40% | 60% | 0.5 eq | |

| General Description | Characteristics: Color | pH | Stable Emulsion (2 wt % ) | GPC Results: MW | Area % <500 MW | Area % <1000 MW |
|---|---|---|---|---|---|---|
| PLA PEG 400 | 11.8 | | No | 816 | 4.172 | 72.509 |
| PLA PEG 600 | | | No | 798 | 4.881 | 75.986 |
| PLA PEG 400 + Citric Acid (0.44 eq) | NA | NA | No | 1322 | 1.307 | 30.964 |
| PLA PEG 400 + Less Citric Acid (0.2 eq) | 12.2 | 5.61 | No | 921 | 3.141 | 53.823 |
| PLA PEG 400 + Dimethyl Glutamate (0.8 eq) | 16.3 | 5.65 | No | 798 | 4.714 | 74.696 |
| PLA PEG 400 + Adipic Acid (1.16 eq) | 4.2 | 3.7 | No | 1336 | 4.738 | 30.063 |
| PLA PEG 400 + Succinic Acid (0.8 eq) | 8.4 | 5.74 | No | 1366 | 0.015 | 22.961 |

TABLE 1-continued

| | | | | | | |
|---|---|---|---|---|---|---|
| PLA PEG 550 Methyl Capped | 16.3 | | No | 973 | 0 | 49.443 |
| PLA PEG 400 Sodium Borohydride | 11.5 | 6.14 | No | 807 | 4.974 | 75.615 |
| PLA PEG 1000 Methyl Capped | NA | NA | No | 1664 | 0.229 | 4.857 |
| PLA PEG 600 | 17.2 | 5.75 | No | 1134 | 1.319 | 32.124 |
| PLA PEG 400 | 11.5 | 5.88 | No | 790 | 6.013 | 79.686 |
| PLA PEG 600 + Citric Acid (0.595 eq) | NA | NA | No | 1961 | 0.004 | 11.798 |
| PLA PEG 300 + Citric Acid (0.635 eq) | NA | NA | No | 1351 | 3.448 | 29.978 |
| Lactic Acid PEG400 | 1 | 2.66 | Yes | | | |
| PLA PEG 400 + Citric Acid (0.5 eq) Higher PEG | | 3.39 | Yes | | | |
| PLA PEG 600 + Succinic Acid (0.5 eq) Higher PEG | | 2.78 | Yes | | | |
| PLA Hydrolyzed + PEG400 + Citric Acid | | | No | | | |
| PLA PEG600 + Succinic Acid | 8 | | | | | |
| PLA PEG600 + Succinic Acid + 2EtHexOH | 8 | | | | | |
| PLA PEG600 + Succinic Acid + C8C10 Alcohol | | 3.3 | | | | |
| PLA PEG600 + Succinic Acid + C8C10 Alcohol | 12 | 3.2 | | | | |
| PLA PEG600 + Succinic Acid + C8C10 Alcohol | 10 | 3.5 | | | | |
| PLA PEG600 + Diethyl Succinate | 8 | | | | | |
| Lactide PEG600 | 10 | | | | | |
| Lactide PEG600 + Succinic Acid | | | | | | |
| Lactide PEG400 | 10 | | | | | |
| Lactide PEG600 | 10 | | | | | |
| Lactide PEG600 | 10 | | | | | |
| PLA PEG400 | 12 | | | | | |
| Lactide PEG400 | 12 | | | | | |
| Lactide PEG 600/ Succinic Acid | 12 | | | | | |

In another aspect of the present invention, the coupled esters of PLA can be combined with other compounds or compositions that do not include coupled esters of PLA to form a finish (i.e., a finish composition"). The weight percent of the coupled ester of PLA in the finish can be between 0.1 and 99.9 percent or between 5 and 95 percent of the weight of the coupled esters of PLA. Examples of other compounds and/or compositions include water, lubricants, emulsifiers, anti-static agents, cohesion agents, antioxidants, anti-corrosion agents, viscosity modifiers, wetting agents, biocides, pH adjustment agents, soil release agents, and stain repellant agents. Exemplary lubricants include PEG fatty acid esters other than coupled esters of PLA, ethoxylated fatty acids, ethoxylated triglycerides, glycerol esters, sorbitan esters, and alkyl esters and/or combinations thereof derived from mineral oils, vegetable oils, and/or animal oils. Exemplary emulsifiers include nonionic agents (e.g., alkyl alcohol ethoxylates, alkyl phenol ethoxylates, fatty amine ethoxylates, and fatty acid ethoxylates and/or combinations thereof); cationic agents (e.g., quaternary fatty amines, quaternary fatty amine ethoxylates, quaternary imidazolines and/or combinations thereof); and anionic agents (e.g., sulfates and phosphates of ethoxylated alkyl alcohols, fatty acid soaps, and/or sulfosuccinate alkyl esters and/or combinations thereof). Exemplary anti-static agents include nonionic agents (e.g., alcohol ethoxylates, alkyl phenol ethoxylates, fatty amine ethoxylates, polyoxyalkylene glycols, ethers, and/or esters and/or combinations thereof), cationic agents (e.g., quaternary amines, quaternary imidazolines, and/or combinations thereof); and anionic (e.g., alkyl alcohol sulfates and/or phosphates, and/or alkyl alcohol ethoxylate sulfates, and/or phosphates, and/or combinations thereof).

A typical soil release formulation includes a permanent-press resin, a catalyst for permanent-press resin, a wetting agent, a high-density polyethylene resin, a fluorine-based soil release chemical, and acetic acid. The typical weight percentages of the compounds are: between 4.0 and 10.0 permanent-press resin, between 5.0 and 10.0 catalyst for permanent press resin, between 0.25 and 1.0 wetting agent, between 3.0 and 6.0 high-density polyethylene resin, between 5.0 and 10.0 fluorine-based soil release chemical, and between 0.0 and 0.25 acetic acid. PEG ester of PLA can be added to a soil release formulation containing a fluorine-based soil release chemical to the soil release agent so that the soil release agent can be more quickly absorbed into a fabric (e.g., less than 10 seconds, 5 seconds, 4 seconds, 3 seconds, or 2 seconds) as determined by applying one drop to the fabric, thus reducing the time to treat the fabric with the soil release agent. Additionally, when a PEG ester of PLA is added to a soil release formulation containing a fluorine-based soil release chemical, the amount of the fluorine-based chemical can be reduced by up to 25, 50, or 75 percent, and the soil release agent will still provide soil release results that are comparable or better results than the soil release agent containing the typical amount (e.g., 5.0 to 10.0 weight percent) of fluorine-based chemical without the PEG ester of PLA.

Coupled esters of PLA act as a surfactant and can be used in personal care products, for example soap, shampoo, and conditioner. Compositions comprising coupled esters of PLA can include other surfactants, for example all-natural polyglucosides.

In yet another aspect, the present invention relates to textiles that are treated with the coupled esters of PLA.

Textiles treated with coupled esters of the PLA have improved surface characteristics, such as hydrophilicity. In one embodiment, the textiles are nonwoven textiles, for example spunbond, meltblown, carded, air laid, wet laid, and/or combinations thereof. In another embodiment, the textiles are woven or knitted. In one embodiment, the textiles are made of or include polyester, for example PLA and/or polyethylene terephthalate. In another embodiment, the textiles are made of or include polypropylene. In another embodiment, the textiles are made of or include polyethylene. In another embodiment, the textiles are made of or include a combination of polypropylene and polyethylene. In another embodiment, the textiles are made of polyamides, acrylics, aramids and/or combinations thereof. In another further embodiment, the textiles are made of or include man-made fibers (e.g., acetate, lyocell, and rayon). In another embodiment, the textiles are made of or include natural fibers, (e.g., bamboo, cotton, flax, hemp, wool, and/or combinations thereof). In another embodiment, the textiles can be made of poly(p-phenylene-2,6-benzobisoxazole) also known as "PBO." In another embodiment the textiles can be made of polyether ether ketone, also known as "PEEK." In another embodiment, the textiles are made of polyether ketone ketone also known as "PEKK." Coupled esters of PLA, when applied to textiles impart improved wetting characteristics (e.g., relatively fast strike-through and multiple strike-through times and/or relatively low rewet (or wetback).

Compositions comprising coupled esters of PLA of the present invention can provide a single liquid strike-through time of 5 seconds or less on a 15 grams per square meter (gsm) spunbond nonwoven made of polypropylene or PLA, 4 seconds or less, or 3 seconds or less as determined by the EDANA (European Disposables and Nonwoven Association) and INDA (Association of the Nonwovens Fabrics Industry) Standard Test: WSP 070.3.R3(12) for Nonwoven Coverstock Liquid Strike-Through Time. The EDANA (European Disposables and Nonwoven Association) and INDA (Association of the Nonwovens Fabrics Industry) Standard Test: WSP 070.3.R3(12) for Nonwoven Coverstock Liquid Strike-Through Time is incorporated herein by reference. Compositions comprising coupled esters of PLA of the present invention can provide multiple or repeated liquid strike-through times of 5 seconds or less for the first three strike-throughs on a 15 gsm PLA or polypropylene spunbond nonwoven or 4 seconds or less as determined by the Standard Test: WSP 070.7.R4(12) for Repeated Liquid Strike-Through Time. Standard Test: WSP 070.7.R4(12) for Repeated Liquid Strike-Through Time is incorporated herein by reference.

Compositions comprising coupled esters of PLA of the present invention can also provide a rewet of at least 0.25 grams or less on a 15 gsm PLA spunbond nonwoven as determined by the Standard Test: WSP 080.10.R3(12) for Nonwovens Coverstock Wetback. Standard Test: WSP 080.10.R3(12) for Nonwovens Coverstock Wetback is incorporated herein by reference. The compositions comprising one or more coupled esters of PLA typically include water so that the weight percent of one or more coupled esters of PLA in the composition can be between 0.1 and 10.0 weight percent, between 0.1 and 5.0 weight percent, and between 0.1 and 1.0 weight percent of the one or more coupled esters of PLA.

Compositions comprising coupled esters of PLA can provide finishes, for example bleaching, scouring, hydrophilic, anti-static, soil release (or stain release), stain resistant, and anti-friction finishes, and/or combinations thereof.

In one embodiment, PEG coupled esters of PLA used in these finishes can be made from PEG 200, PEG 300, PEG 400, PEG 600, PEG 800, PEG 1000, PEG 1200, PEG 1400, PEG 1450 and/or mixtures thereof, which are commercially available. The coupled PEG esters of PLA can also be made from PEG having molecular weights between 100 and 1000, between 200 and 800, and between 300 and 700. PEG coupled PEG esters of PLA can have PEG:PLA ratios between 30:70 and 70:30, between 40:60 and 60:40, and between 45:55 and 55:45. In a preferred embodiment, the coupled PEG esters of PGA are made from PEG 400 and the PEG:PGA ratio is 50:50. PEG esters of PGA, namely a PEG 400 ester of PGA having a PEG:PGA ratio of 44:56, a coupled PEG 200 ester of PGA having a 50:50 PEG:PGA ratio, a coupled PEG 400 ester of PGA having a 50:50 PEG:PGA ratio, a coupled PEG 600 ester of PGA having a PEG:PGA ratio of 50:50, a PEG 1450 ester of PLA having a PEG:PLA ratio of 50:50 have favorable smoke and flash-point point characteristics (e.g., smoke is less than 171° F. and flash is less than 244° F.) and favorable friction characteristics. For example, a soil release finish can comprise PEG esters of PLA, such as those identified above, an oil/water repellent, a wetting/wicking agent, and a hydrophilic binder. In one embodiment, the soil release finish includes an ester of PLA, permanent press resin, a catalyst for the permanent-press resin, a wetting agent, a high-density polyethylene resin, a fluorine-based soil release chemical, and/or an acid for pH adjustment (e.g., acetic acid, citric acid or glycolic acid). The addition of an ester of PLA can reduce the requirement for the expensive fluorine-based soil release chemical by up to 10 percent, 20 percent, 30 percent, 40 percent, 50 percent, or 60 percent while providing comparable or improved soil release results. The addition of the ester of PLA improves the drop reflectance. One liter of soil release finish can comprise between 1 and 40 grams, between 1 and 30 grams, between 1 and 20 grams, between 1 and 15 grams, or between 1 and 10 grams of PEG esters of PGA. Two liters of finish can comprise twice the one-liter amounts of PEG ester of PGA, three liters of finish can comprise three times the one-liter amounts of PEG ester of PLA, and so forth.

Compositions comprising coupled esters of PLA and/or coupled esters of PGA can be applied to textiles by roll coating, padding, dripping, spraying in an amount that provide the desired strike-through and/or rewet characteristics. For example, the compositions comprising esters of PLA can be applied to provide a finish on yarn (FOY) level between 0.1 and 10.0 weight percent FOY, between 0.2 and 3.0 weight percent, between 0.3 and 1.0 weight percent, and between 0.3 and 0.8 weight percent. Thus, another aspect of the present invention are textiles treated with one or more esters of PLA described above or compositions containing one or more esters of PLA described above.

Results of tests comparing conventional soil release formulations without the coupled PEG ester of PLA and the soil release formulations with PEG ester of PLA are presented in Tables 2b-2c, 3b-3c, 4b-4c, 5b-5d, 6b-6d, and 7b-7d below. Soil release formulations containing PEG esters of PLA and coupled esters of PLA were tested on 100 percent polyester, polyester/cotton blend (65:35 poly/cotton), and nylon fabrics. The results were compared to Nonax® MM, a conventional polyester copolymer used as a release agent sold by Pulcra Chemicals.

Polyester copolymers are used to make synthetic fibers absorb or wick water, particularly for apparel and sports fabrics. Polyester copolymers also claim to improve the soil release properties of the fabric. The PEG esters of PLA were also tested to determine if PEG esters of PLA would improve static electricity on textiles. Three esters of PLA were compared to a common polyester copolymer finish sold by Pulcra Chemicals LLC under the tradename Nonax® MM. Nonax® MM and the PEG ester of PLA were applied to the fabric by pad method and then dried and cured the fabric. The formulation was applied to 100% Polyester fabric, 65/35 Polyester/Cotton fabric and 100% Nylon fabric. To determine wicking, one end of a strip of treated fabric was immersed in water allowing the water to wick up the fabric. The higher the water wicked up the fabric, the better wicking property. The distance that the water wicked up the fabric was measured in millimeters ("mm"). The same test procedure was used for soil release above in the wicking soil release experiments. When measuring wicking properties of esters of PLA in soil release agents, the soil release agent formulations below were padded and then dried and cured on the fabric at 177° C.

Soil release formulas and results of the tests are set forth in the several tables (below) in which higher numbers correspond to higher soil-release performance:

TABLE 2a (100% Polyester Wicking Test Results)

| | Wicking Initial | 5X Wash Cycles |
|---|---|---|
| Water Only | 2 mm | 50 mm |
| 5.0% Nonax MM | 82 mm | 95 mm |
| 1.25% PEG 400 | 73 mm | 65 mm |
| 1.25% PEG 400 w Citric Acid | 64 mm | 77 mm |
| 1.25% PEG 600 | 75 mm | 87 mm |

TABLE 2b (100% Polyester Soil Release Results - Initial)

| | Soil Release Corn Oil | Initial Mineral Oil | Motor Oil | Dirty Motor Oil | Ketchup | Mustard |
|---|---|---|---|---|---|---|
| Water Only | 4 | 4 | 3 | 1 | 2 | 4 |
| 5.0% Nonax MM | 5 | 5 | 5 | 2 | 2.5 | 5 |
| 1.25% PEG 400 | 4 | 4 | 3 | 1 | 3 | 5 |
| 1.25% PEG 400 w Citric Acid | 3 | 5 | 4 | 0 | 3.5 | 4 |
| 1.25% PEG 600 | 4 | 5 | 3.5 | 0 | 3 | 4 |

TABLE 2c (100% Polyester Soil Release Results - 5 washes)

| | Soil Release Corn Oil | 5 Home Laundries Mineral Oil | Motor Oil | Dirty Motor Oil | Ketchup | Mustard |
|---|---|---|---|---|---|---|
| Water Only | 4 | 4 | 2.5 | 0 | 2 | 4 |
| 5.0% Nonax MM | 5 | 5 | 3 | 0 | 2 | 5 |
| 1.25% PEG 400 | 4 | 4 | 3 | 0 | 2 | 5 |
| 1.25% PEG 400 w Citric Acid | 3 | 4 | 2 | 0 | 3 | 4 |
| 1.25% PEG 600 | 4 | 4 | 3 | 0 | 2 | 4 |

TABLE 2d (100% Polyester Anti-Static Results - % on weight of goods (% owg)

| | Initial | | After 5 Washes | |
|---|---|---|---|---|
| | Time to 75 V | Final Static | Time to 75 V | Final Static |
| Water | N/A | 149.0 | N/A | 138.0 |
| | N/A | 150.8 | N/A | 143.4 |
| | N/A | 149.9 | N/A | 139.2 |
| Average | N/A | 149.9 | N/A | 140.2 |
| 5.0% owg Nonax | N/A | 10.9 | N/A | 149.0 |
| MM | N/A | 25.7 | N/A | 146.3 |
| | N/A | 20.1 | N/A | 146.6 |
| Average | N/A | 18.9 | N/A | 147.3 |
| 1.25% owg PEG | N/A | 146.0 | N/A | 134.1 |
| 400 | N/A | 148.5 | N/A | 127.6 |
| | N/A | 146.2 | N/A | 131.2 |
| Average | N/A | 146.9 | N/A | 131.0 |
| 1.25% owg PEG | N/A | 146.2 | N/A | 95.6 |
| 400 w/Citric | N/A | 149.3 | N/A | 93.1 |
| | N/A | 145.0 | N/A | 93.9 |
| Average | N/A | 146.8 | N/A | 94.2 |
| 1.25% owg PEG | N/A | 146.0 | N/A | 140.0 |
| 600 | N/A | 149.7 | N/A | 144.6 |
| | N/A | 148.4 | N/A | 149.7 |
| Average | N/A | 148.0 | N/A | 144.8 |

TABLE 3a (65% Polyester/50% Cotton Wicking)

| | Wicking Initial | 5X Wash Cycles |
|---|---|---|
| Water Only | 51 mm | 70 mm |
| 5.0% Nonax MM | 70 mm | 70 mm |
| 1.25% PEG 400 | 62 mm | 75 mm |
| 1.25% PEG 400 w Citric Acid | 63 mm | 72 mm |
| 1.25% PEG 600 | 62 mm | 74 mm |

TABLE 3b (65% Polyester/50% Cotton Soil Release - Initial)

| | Soil Release Corn Oil | Initial Mineral Oil | Motor Oil | Dirty Motor Oil | Ketchup | Mustard |
|---|---|---|---|---|---|---|
| Water Only | 2 | 4 | 1 | 0 | 4 | 4 |
| 5.0% Nonax MM | 2 | 4 | 1 | 1 | 3.5 | 4 |
| 1.25% PEG 400 | 2 | 3 | 1 | 0 | 4 | 3 |
| 1.25% PEG 400 w Citric Acid | 2 | 3 | 1 | 0 | 4 | 4 |
| 1.25% PEG 600 | 1 | 3 | 0 | 0 | 4 | 4 |

TABLE 3c (65% Polyester/50% Cotton Soil Release - 5 washes)

| | Soil Release Corn Oil | 5 Home Laundries Mineral Oil | Motor Oil | Dirty Motor Oil | Ketchup | Mustard |
|---|---|---|---|---|---|---|
| Water Only | 2 | 4 | 1 | 1 | 4 | 4 |
| 5.0% Nonax MM | 2 | 3 | 1 | 1 | 4 | 4 |
| 1.25% PEG 400 | 2 | 2 | 1 | 0 | 4 | 4 |
| 1.25% PEG 400 w Citric Acid | 2 | 2 | 0 | 0 | 4 | 4 |
| 1.25% PEG 600 | 1 | 2 | 0 | 0 | 3.5 | 4 |

TABLE 4a (100% Nylon Wicking Results)

| | Wicking Initial | 5X Wash Cycles |
|---|---|---|
| Water Only | 12 mm | 8 mm |
| 5.0% Nonax MM | 57 mm | 64 mm |
| 1.25% PEG 400 | 43 mm | 21 mm |
| 1.25% PEG 400 w Citric Acid | 37 mm | 25 mm |
| 1.25% PEG 600 | 51 mm | 11 mm |

TABLE 4b (100% Nylon Soil Release - Initial)

| | Soil Release Corn Oil | Initial Mineral Oil | Motor Oil | Dirty Motor Oil | Ketchup | Mustard |
|---|---|---|---|---|---|---|
| Water Only | 3.5 | 5 | 3 | 1 | 4 | 2 |
| 5.0% Nonax MM | 5 | 4 | 4 | 4 | 4 | 2 |
| 1.25% PEG 400 | 4 | 4 | 3 | 0 | 4 | 1 |
| 1.25% PEG 400 w Citric Acid | 4 | 4 | 3 | 0 | 4 | 2 |
| 1.25% PEG 600 | 4 | 4 | 2.5 | 1 | 4 | 1 |

TABLE 4c (100% Nylon Soil Release - 5 Washes)

| | Soil Release Corn Oil | 5 Home Laundries Mineral Oil | Motor Oil | Dirty Motor Oil | Ketchup | Mustard |
|---|---|---|---|---|---|---|
| Water Only | 4 | 2 | 2 | 0 | 3.5 | 1 |
| 5.0% Nonax MM | 5 | 4 | 3 | 2 | 4 | 2.5 |
| 1.25% PEG 400 | 4 | 4 | 3 | 1 | 4 | 3 |
| 1.25% PEG 400 w Citric Acid | 4 | 5 | 2.5 | 1.5 | 4 | 3 |
| 1.25% PEG 600 | 4 | 4 | 3 | 1 | 4.5 | 2.5 |

TABLE 4d

| (100% Nylon Anti-Static Results) | Initial | | After 5 Washes | |
|---|---|---|---|---|
| | Time to 75 Volts | Final Static | Time to 75 Volts | Final Static |
| Water | N/A | 145.1 | N/A | 144.8 |
| | N/A | 144.6 | N/A | 146.7 |
| | N/A | 143.1 | N/A | 142.4 |
| Average | N/A | 144.3 | N/A | 144.6 |
| 5.0% owg Nonax | N/A | 125.7 | N/A | 143.2 |
| MM | N/A | 131.0 | N/A | 146.1 |
| | N/A | 133.5 | N/A | 144.3 |
| Average | N/A | 130.1 | N/A | 144.5 |
| 1.25% owg PEG | N/A | 105.0 | N/A | 143 |
| 400 | N/A | 120.1 | N/A | 147.3 |
| | N/A | 124.4 | N/A | 143.5 |
| Average | N/A | 116.5 | N/A | 144.6 |
| 1.25% owg PEG | N/A | 121.7 | N/A | 145.2 |
| 400 w/Citric | N/A | 127.5 | N/A | 143 |
| | N/A | 126.8 | N/A | 143.1 |
| Average | N/A | 125.3 | N/A | 143.8 |
| 1.25% owg PEG | N/A | 115.2 | N/A | 144.7 |
| 600 | N/A | 113.8 | N/A | 143.4 |
| | N/A | 117.9 | N/A | 146 |
| Average | N/A | 115.6 | N/A | 144.7 |

Wicking and soil release testing was repeated as described on 100 percent polyester, 65 percent/35 percent polyester/cotton, and 100 percent nylon as described above. Results for 100 percent polyester are shown in Tables 5b-5d below. The pH of the soil release agents was adjusted to a pH between 4 and 5. Subsequent soil release agent testing was repeated on 100 percent polyester as described above. The test results for wicking, soil release on the initial fabric before washing, after five wash cycles, and after ten wash cycles, and whiteness are shown in Table 5a-5e below. The pH for each soil release agent was adjusted to a pH between 4-5.

TABLE 5a

| (100% Polyester) | Wicking Initial | 5 Washes | 10 Washes |
|---|---|---|---|
| #1 Water | 5 mm | 50 mm | 79 mm |
| #2 4.0% owg Nonax MM - Control | 78 mm | 80 mm | 92 mm |
| #3 1.00% owg (PLA-PEG 400) | 58 mm | 81 mm | 62 mm |
| #4 2.00% owg (PLA-PEG 400) | 58 mm | 51 mm | 72 mm |
| #5 1.00% owg (50:50 PLA & PEG 400) | 57 mm | 91 mm | 71 mm |
| #6 2.00% owg (50:50 PLA & PEG 400) | 74 mm | 87 mm | 100 mm |
| #7 1.00% owg (PLA-PEG 600) | 83 mm | 96 mm | 95 mm |
| #8 2.00% owg (PLA-PEG 600) | 84 mm | 99 mm | 101 mm |

TABLE 5b

| 100% Polyester Soil Release Results - Initial | Soil Release Mineral Oil | Corn Oil | Initial Motor Oil | Dirty Motor Oil | Ketchup | Mustard |
|---|---|---|---|---|---|---|
| #1 Water | 4 | 4 | 4 | 0 | 4 | 5 |
| #2 4.0% owg Nonax MM | 4 | 4 | 4 | 1 | 5 | 5 |
| #3 1.00% owg (PLA-PEG 400) | 4 | 4 | 3 | 0 | 4 | 4 |
| #4 2.00% owg (PLA-PEG 400) | 4 | 4 | 3.5 | 1 | 4 | 4 |
| #5 1.00% owg (50:50 PLA & PEG 400) | 4 | 4 | 3.5 | 0 | 4 | 4 |
| #6 2.00% owg (50:50 PLA & PEG 400) | 4.5 | 4 | 3 | 1 | 4 | 4.5 |
| #7 1.00% owg (PLA-PEG 600) | 4.5 | 4.5 | 3.5 | 0 | 4.5 | 4.5 |
| #8 2.00% owg 07896-169 (PLA-PEG 600) | 4.5 | 4.5 | 4.5 | 1 | 4.5 | 5 |

TABLE 5c

| 100% Polyester Soil Release-5 washes | Soil | 5 Wash Cycles | | | | |
|---|---|---|---|---|---|---|
| | Release Mineral Oil | Corn Oil | Motor Oil | Dirty Motor Oil | Ketchup | Mustard |
| #1 Water | | | | | | |
| #2 4.0% owg Nonax MM | 4.5 | 4 | 3.5 | 1 | 4 | 4.5 |
| #3 1.00% owg (PLA-PEG 400) | 4 | 4 | 3.5 | 1 | 4 | 4.5 |
| #4 2.00% owg (PLA-PEG 400) | 4.5 | 4 | 3 | 1 | 4 | 4.5 |
| #5 1.00% owg (50:50 PLA & PEG 400) | 4.5 | 4 | 3.5 | 0 | 3.5 | 4.5 |
| #6 2.00% owg (50:50 PLA & PEG 400) | 4.5 | 4 | 3.5 | 0 | 3.5 | 4 |
| #7 1.00% OWG (PLA-PEG 600) | 4 | 4 | 3.5 | 1 | 4 | 4 |
| #8 2.00% OWG (PLA-PEG 600) | 5 | 3.5 | 3 | 1 | 4 | 4 |
| | 5 | 4 | 3 | 1 | 4 | 4.5 |

TABLE 5d

100% Polyester Soil Release - 10 washes

| | Soil Release Mineral Oil | 10 Wash Cycles Corn Oil | Motor Oil | Dirty Motor Oil | Ketchup | Mustard |
|---|---|---|---|---|---|---|
| #1 Water | 4 | 3.5 | 3 | 1 | 3.5 | 4 |
| #2 4.0% owg Nonax MM | 4.5 | 4 | 4 | 1 | 3.5 | 5 |
| #3 1.00% owg (PLA-PEG 400) | 4.5 | 4.5 | 3.5 | 1 | 3.5 | 5 |
| #4 2.00% owg (PLA-PEG 400) | 4.5 | 4 | 4.5 | 1 | 4.5 | 4.5 |
| #5 1.00% owg (50:50 PLA & PEG 400) | 4.5 | 4 | 4.5 | 1 | 3.5 | 4 |
| #6 2.00% owg (50:50 PLA & PEG 400) | 4.5 | 4 | 3.5 | 1 | 3.5 | 5 |
| #7 1.00% owg (PLA-PEG 600) | 4.5 | 4.5 | 3 | 1 | 3.5 | 4.5 |
| #8 2.00% owg (PLA-PEG 600) | 4.5 | 4.5 | 3 | 1 | 4 | 5 |

TABLE 5e

100% Polyester - whiteness

| | Whiteness Values Polyester | Poly/ Cotton | ASTM E-313 Nylon |
|---|---|---|---|
| #1 Water | 84.84 | 101.52 | 83.22 |
| #2 4.0% owg Nonax MM | 82.25 | 103.38 | 76.25 |
| #3 1.00% owg (PLA-PEG 400) | 64.49 | 96.64 | 54.88 |
| #4 2.00% owg (PLA-PEG 400) | 59.23 | 73.14 | 33.55 |
| #5 1.00% owg (50:50 PLA & PEG 400) | 81.8 | 102.27 | 77.98 |
| #6 2.00% owg (50:50 PLA & PEG 400) | 81.53 | 102.85 | 78.84 |
| #7 1.00% owg (PLA-PEG 600) | 81.53 | 102.41 | 81.54 |
| #8 2.00% owg (PLA-PEG 600) | 80.16 | 103.35 | 75.98 |

Subsequent wicking agent and soil release agent testing was repeated on 65/35 percent polyester/cotton as described above. The tests results for wicking and soil release agents on the initial fabric before washing, after five wash cycles, and after ten wash cycles are shown in Tables 6a-6d below. The pH for each soil release agent was adjusted to a pH between 4 and 5.

TABLE 6a

65/35 Poly/Cotton-Wicking

| | 65/35 Poly Cotton Wicking Initial | 5 Washes | 10 Washes |
|---|---|---|---|
| #1 Water | 42 mm | 51 mm | 60 mm |
| #2 4.0% owg Nonax MM | 54 mm | 50 mm | 58 mm |
| #3 1.00% owg (PLA-PEG 400) | 49 mm | 59 mm | 60 mm |
| #4 2.00% owg (PLA-PEG 400) | 48 mm | 60 mm | 59 mm |

TABLE 6a-continued

65/35 Poly/Cotton-Wicking

| | 65/35 Poly Cotton Wicking Initial | 5 Washes | 10 Washes |
|---|---|---|---|
| #5 1.00% owg (50:50 PLA & PEG 400) | 49 mm | 62 mm | 59 mm |
| #6 2.00% owg (50:50 PLA & PEG 400) | 45 mm | 60 mm | 58 mm |
| #7 1.00% owg (PLA-PEG 600) | 52 mm | 56 mm | 57 mm |
| #8 2.00% owg 07896-169 (PLA-PEG 600) | 53 mm | 55 mm | 59 mm |

TABLE 6b

65/35 Poly/Cotton-Initial

| | Soil Release Mineral Oil | Corn Oil | Initial Motor Oil | Dirty Motor Oil | Ketch-up | Mus-tard |
|---|---|---|---|---|---|---|
| #1 Water | 5 | 4.5 | 4.5 | 1 | 3.5 | 3 |
| #2 4.0% owg Nonax MM | 5 | 4.5 | 4 | 1.5 | 4 | 3.5 |
| #3 1.00% owg (PLA-PEG 400) | 4.5 | 4.5 | 4.5 | 1 | 3.5 | 3 |
| #4 2.00% owg (PLA-PEG 400) | 4.5 | 4.5 | 4.5 | 1 | 3.5 | 3 |
| #5 1.00% owg (50:50 PLA & PEG 400) | 4.5 | 4.5 | 4.5 | 1 | 3.5 | 3 |
| #6 2.00% owg (50:50 PLA & PEG 400) | 4.5 | 4.5 | 4.5 | 1 | 3.5 | 3 |
| #7 1.00% owg (PLA-PEG 600) | 4.5 | 4.5 | 4.5 | 1 | 3.5 | 3.5 |
| #8 2.00% owg (PLA-PEG 600) | 4.5 | 4.5 | 4.5 | 1 | 3.5 | 3.5 |

TABLE 6c

| 65/35 Poly/Cotton-5 washes | | | | | | |
| | Soil | | 5 Wash Cycles | | | |
| | Release Mineral Oil | Corn Oil | Motor Oil | Dirty Motor Oil | Ketchup | Mustard |
| --- | --- | --- | --- | --- | --- | --- |
| #1 Water | 5 | 4.5 | 4 | 1 | 23.5 | 3.5 |
| #2 4.0% owg Nonax MM | 5 | 4.5 | 4.5 | 1.5 | 4 | 3.5 |
| #3 1.00% owg (PLA-PEG 400) | 5 | 4.5 | 4.5 | 1 | 4 | 3.5 |
| #4 2.00% owg (PLA-PEG 400) | 4 | 4.5 | 4 | 1 | 3.5 | 3 |
| #5 1.00% owg (50:50 PLA & PEG 400) | 5 | 4 | 4 | 1 | 3.5 | 3.5 |
| #6 2.00% owg (50:50 PLA & PEG 400) | 4.5 | 4.5 | 4 | 1 | 3.5 | 3.5 |
| #7 1.00% owg (PLA-PEG 600) | 4 | 3.5 | 3.5 | 1 | 3.5 | 3.5 |
| #8 2.00% owg (PLA-PEG 600) | 4 | 4 | 3.5 | 1 | 3.5 | 3.5 |

TABLE 6d

| 65/35 Poly/Cotton-10 washes | | | | | | |
| | Soil | | 10 Wash Cycles | | | |
| | Release Mineral Oil | Corn Oil | Motor Oil | Dirty Motor Oil | Ketchup | Mustard |
| --- | --- | --- | --- | --- | --- | --- |
| #1 Water | 4.5 | 4 | 4 | 1 | 3.5 | 3 |
| #2 4.0% owg Nonax MM | 5 | 4.5 | 4.5 | 1 | 3.5 | 3 |
| #3 1.00% owg (PLA-PEG 400) | 4.5 | 4.5 | 4 | 1 | 3.5 | 3 |
| #4 2.00% owg (PLA-PEG 400) | 4.5 | 4.5 | 4 | 1 | 3 | 3 |
| #5 1.00% owg (50:50 PLA & PEG 400) | 4.5 | 4 | 3.5 | 1 | 3 | 3 |
| #6 2.00% owg (50:50 PLA & PEG 400) | 4.5 | 4.5 | 3.5 | 1 | 3.5 | 3 |
| #7 1.00% owg (PLA-PEG 600) | 5 | 5 | 3.5 | 1 | 3.5 | 3 |
| #8 2.00% owg (PLA-PEG 600) | 5 | 4 | 4 | 1 | 3.5 | 3 |

TABLE 7a

| 100% Nylon 6 - Wicking | | | |
| | Wicking Initial | 5 Washes | 10 Washes |
| --- | --- | --- | --- |
| #1 Water | 14 mm | 31 mm | 21 mm |
| #2 4.0% owg Nonax MM | 28 mm | 15 mm | 23 mm |
| #3 1.00% (PLA-PEG 400) | 33 mm | 23 mm | 28 mm |
| #4 2.00% (PLA-PEG 400) | 34 mm | 15 mm | 26 mm |
| #5 1.00% (50:50 PLA & PEG 400) | 32 mm | 15 mm | 25 mm |

TABLE 7a-continued

| 100% Nylon 6 - Wicking | | | |
| | Wicking Initial | 5 Washes | 10 Washes |
| --- | --- | --- | --- |
| #6 2.00% owg (50:50 PLA & PEG 400) | 29 mm | 46 mm | 27 mm |
| #7 1.00% owg (PLA-PEG 600) | 38 mm | 10 mm | 35 mm |
| #8 2.00% owg (PLA-PEG 600) | 39 mm | 23 mm | 33 mm |

TABLE 7b

| 100% Nylon 6 - Initial | | | | | | |
| | Soil Release Mineral Oil | Corn Oil | Initial Motor Oil | Dirty Motor Oil | Ketchup | Mustard |
| --- | --- | --- | --- | --- | --- | --- |
| #1 Water | 4 | 3.5 | 4 | 2 | 4 | 3 |
| #2 4.0% owg Nonax MM | 5 | 3.5 | 4 | 2.5 | 4 | 3.5 |
| #3 1.00% owg (PLA-PEG 400) | 4 | 5 | 3.5 | 2 | 4.5 | 3.5 |
| #4 2.00% owg (PLA-PEG 400) | 5 | 5 | 3.5 | 1.5 | 4.5 | 3.5 |
| #5 1.00% owg (50:50 PLA & PEG 400) | 5 | 5 | 3.5 | 1.5 | 4.5 | 3.5 |
| #6 2.00% owg (50:50 PLA & PEG 400) | 5 | 5 | 3.5 | 1.5 | 4.5 | 3 |
| #7 1.00% owg ( PLA-PEG 600) | 5 | 5 | 3.5 | 1.5 | 4.5 | 3 |
| #8 2.00% owg ( PLA-PEG 600) | 5 | 5 | 3.5 | 1.5 | 4.5 | 3 |

TABLE 7c

| 100% Nylon 6 - 5 washes | | | | | | |
|---|---|---|---|---|---|---|
| | Soil Release Mineral Oil | 5 Wash Cycles Corn Oil | Motor Oil | Dirty Motor Oil | Ketchup | Mustard |
| #1 Water | 4.5 | 4.5 | 3.5 | 2 | 4.5 | 3.5 |
| #2 4.0% owg Nonax MM | 5 | 4.5 | 3.5 | 2 | 4.5 | 3.5 |
| #3 1.00% owg (PLA-PEG 400) | 5 | 4.5 | 3.5 | 1.5 | 4.5 | 3 |
| #4 2.00% owg (PLA-PEG 400) | 5 | 5 | 3.5 | 2 | 4.5 | 3 |
| #5 1.00% owg (50:50 PLA & PEG 400) | 5 | 5 | 4 | 2.5 | 5 | 3 |
| #6 2.00% owg (50:50 PLA & PEG 400) | 5 | 4.5 | 4 | 2.5 | 5 | 3 |
| #7 1.00% owg (PLA-PEG 600) | 5 | 5 | 3.5 | 2.5 | 4.5 | 3 |
| #8 2.00% owg (PLA-PEG 600) | 5 | 5 | 3.5 | 2.5 | 4.5 | 3.5 |

TABLE 7d

| 100% Nylon 6 - 10 washes | | | | | | |
|---|---|---|---|---|---|---|
| | Soil Release Mineral Oil | 10 Wash Cycles Corn Oil | Motor Oil | Dirty Motor Oil | Ketchup | Mustard |
| #1 Water | 4.5 | 4.5 | 3.5 | 2 | 4 | 3 |
| #2 4.0% owg Nonax MM | 5 | 5 | 3.5 | 2.5 | 4.5 | 3 |
| #3 1.00% owg (PLA-PEG 400) | 4 | 4 | 3.5 | 2 | 4 | 3 |
| #4 2.00% owg (PLA-PEG 400) | 4.5 | 4.5 | 3.5 | 2.5 | 4.5 | 2.5 |
| #5 1.00% owg (50:50 PLA & PEG 400) | 4 | 4 | 3 | 2 | 4.5 | 3 |
| #6 2.00% owg (50:50 PLA & PEG 400) | 4 | 4 | 3.5 | 2.5 | 4.5 | 3 |
| #7 1.00% owg (PLA-PEG 600) | 4.5 | 4.5 | 3.5 | 2.5 | 4.5 | 3 |
| #8 2.00% owg (PLA-PEG 600) | 4.5 | 4.5 | 4 | 2.5 | 4.5 | 3 |

The foregoing detailed description sets forth typical embodiments. The present disclosure is not limited to such exemplary embodiments. The present disclosure may utilize any variety of aspects, features, or steps, or combinations thereof.

In the specification and/or figures, examples of embodiments have been disclosed. Unless otherwise noted, specific terms have been used in a generic and descriptive sense and not for purposes of limitation.

The use of the term "and/or" includes any and all combinations of one or more of the associated listed items. For the ranges of temperature, percentages, daltons, etc., set forth above (e.g., in the form "between x and y"), "between" means "inclusively between" so that the numbers provided in the ranges are included in the ranges (e.g., between 1 and 10 includes 1 and 10).

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A material to which a composition comprising at least one coupled ester of polylactic acid is applied, wherein the at least one coupled ester of polylactic acid is a chemical compound, wherein the chemical compound comprises the reaction product of:

polyethylene glycol;

a dicarboxylic acid as a coupler; and polylactic acid, wherein the compound has a weight-average molecular weight of less than 2000 daltons, wherein the composition is a soil-release formulation, wherein the composition comprises a fluorine-based compound, and wherein the material is a nonwoven textile, a woven textile or a knitted textile, and wherein the weight-percent ratio of the polyethylene glycol to the polylactic acid is between 65:35 and 35:65.

2. The material of claim 1, wherein the polyethylene glycol has a weight-average molecular weight between 124 daltons and 1450 daltons as determined by gel permeation chromatography.

3. The material of claim 1, wherein less than 25 mole percent of the composition has a weight-average molecular weight less than 1000 daltons as determined by gel permeation chromatography.

4. The material of claim 1, wherein the dicarboxylic acid comprises an aromatic dicarboxylic acid.

5. The material of claim 1, wherein in the chemical compound the coupler is present between 0.2 and 1.0 mole equivalence to the polyethylene glycol.

6. The material of claim 1, wherein the reaction product is biodegradable and/or compostable.

7. The material of claim 1, wherein the weight-percent ratio of the polyethylene glycol to the polylactic acid is between 60:40 and 40:60.

8. The material of claim 1, wherein the weight-percent ratio of the polyethylene glycol to the polylactic acid is between 55:45 to 45:55.

* * * * *